Figure 1:
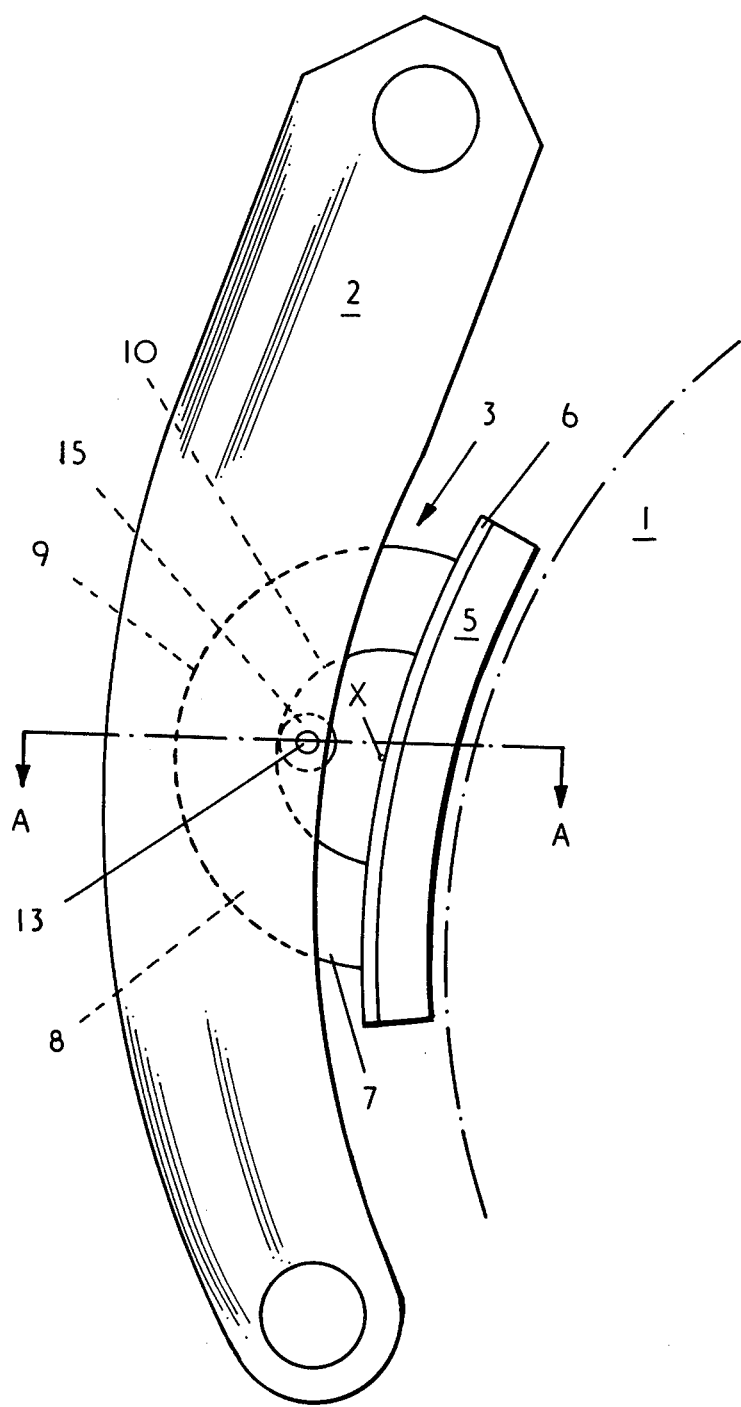

United States Patent [19]
Parfitt

[11] 4,151,901
[45] May 1, 1979

[54] BRAKE SHOE MOUNTING ARRANGEMENT

[75] Inventor: Norman L. C. Parfitt, Ashby-de-la-Zouch, England

[73] Assignee: Coal Industry (Patents) Limited, London, England

[21] Appl. No.: 831,965

[22] Filed: Sep. 9, 1977

[30] Foreign Application Priority Data

Sep. 17, 1976 [GB] United Kingdom ............... 38553/76

[51] Int. Cl.$^2$ ............................................. F16D 65/04
[52] U.S. Cl. .................. 188/250 F; 188/234; 188/247
[58] Field of Search ........................ 188/49, 50, 51, 52, 188/53, 54, 55, 56, 75, 219.6, 220.1, 220.6, 221.1, 234, 235, 236, 247, 248, 250 R, 250 B, 250 F, 250 G

[56] References Cited

U.S. PATENT DOCUMENTS

| 2,128,387 | 8/1938 | Wehr | 188/221.1 |
|---|---|---|---|
| 2,933,163 | 4/1960 | Collings | 188/220.1 |
| 3,391,764 | 7/1968 | Arthur | 188/221.1 |

FOREIGN PATENT DOCUMENTS

| 390803 | 11/1920 | Fed. Rep. of Germany | 188/234 |
|---|---|---|---|
| 530574 | 7/1931 | Fed. Rep. of Germany | 188/221.1 |
| 132107 | 7/1951 | Sweden | 188/236 |
| 665273 | 1/1952 | United Kingdom. | |
| 728709 | 4/1955 | United Kingdom. | |
| 783081 | 9/1957 | United Kingdom. | |
| 936143 | 9/1963 | United Kingdom. | |

*Primary Examiner*—Edward R. Kazenske
*Attorney, Agent, or Firm*—Stevens, Davis, Miller & Mosher

[57] ABSTRACT

Brake equipment comprising a brake shoe arrangement including a brake pad and a curved vane wherein the brake shoe arrangement is constrained by the curved vane to rotate about its center of mass only. The brake equipment mitigates problems associated with uneven wear of the brake pad resulting from operational vibration and possible consequent movement of the brake shoe arrangement because of imbalance thereof.

8 Claims, 6 Drawing Figures

BRAKE SHOE MOUNTING ARRANGEMENT

The present invention relates to brake equipment and to brake shoe arrangements for use in said brake equipment, particularly to brake equipment including levers for supporting brake shoe arrangements. Such brake equipment finds application particularly but not exclusively upon manriding and supplies cars in an underground mine.

The brake equipment is actuated by springs in association with compressed air, such that the springs are adapted to urge the brake equipment towards the 'brake applied' position and compressed air is used to release the brake.

Brake shoe arrangements include friction pads, and in normal use of the brake equipment the friction pads are worn away by braking co-operation with a wheel or with a member attached to the wheel, and consequently the brake shoe arrangements require periodic replacement.

Unfortunately upon replacement of brake shoe arrangements comprising part of known brake equipment, it has been found that the friction pads have worn unevenly. A known brake shoe arrangement is secured on a lever of a known type by a bolt which is inserted through the known brake shoe arrangement and the known lever. The known brake shoe arrangement is free to pivot about the securing bolt and experiences a resultant torque thereabout when subject to gravity.

Uneven wear of the known brake shoe arrangement is caused by pivotal movement therefore about the securing bolt away from an optimum alignment position owing to vibration of the brake equipment.

The pivotal movement results in a part of the brake shoe arrangement friction pad moving into braking co-operation in advance of the remainder when the brake equipment is in use. In consequence, said part is worn away in advance of the remainder. However, if the brake shoe arrangement had remained in the desired alignment position, then the friction pad would have worn evenly.

The uneven wear is undesirable insofar as it causes discarding of only incompletely worn brake shoes and causes excessively frequent changes of brake shoes.

To mitigate the above problems it has been proposed that a friction pad should be manufactured so as to have uneven thickness, being thickest at the part subject to the greatest wear, in an attempt to ensure that the friction pad has a longer life at that part.

It has also been proposed that the levers for supporting the brake shoe arrangements and the brake shoe arrangements themselves should be modified so that the brake shoe arrangements are fixedly mounted with respect to their respective support levers.

Unfortunately, the above proposals cause complexity of manufacture of brake equipment, entail greater expense, and do not necessarily overcome the problems.

It is an object of the present invention to provide improved brake equipment of which the brake shoes tend to wear more evenly, thereby alleviating the above mentioned problems.

According to the present invention, brake equipment comprises a support lever containing a recess means, and a brake shoe arrangement comprising a brake shoe with a friction pad and a vane fixedly attached to opposite sides thereof, said vane having a peripheral edge equidistant throughout from a center of mass of the brake shoe arrangement, the peripheral edge being shaped to slidably engage within the recess means in the support lever so that the brake shoe arrangement is constrained to rotate about the center of mass.

Preferably, the brake equipment comprises retaining means for retaining the vane of the brake shoe arrangement in slidable engagement with the recess means in the support lever.

Conveniently, the brake shoe arrangement is resiliently attached to the retaining means.

Advantageously, the retaining means comprises a bolt, insertable within the support lever and a resilient bush, the resilient bush abutting the vane of the brake shoe arrangement.

The invention also provides a brake shoe arrangement for use in the above defined equipment.

Figure 2:
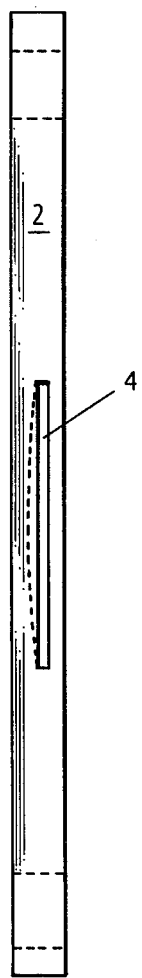
Figure 3:
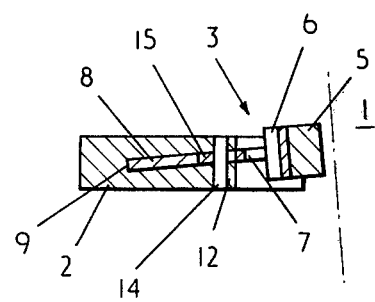
Figure 4:
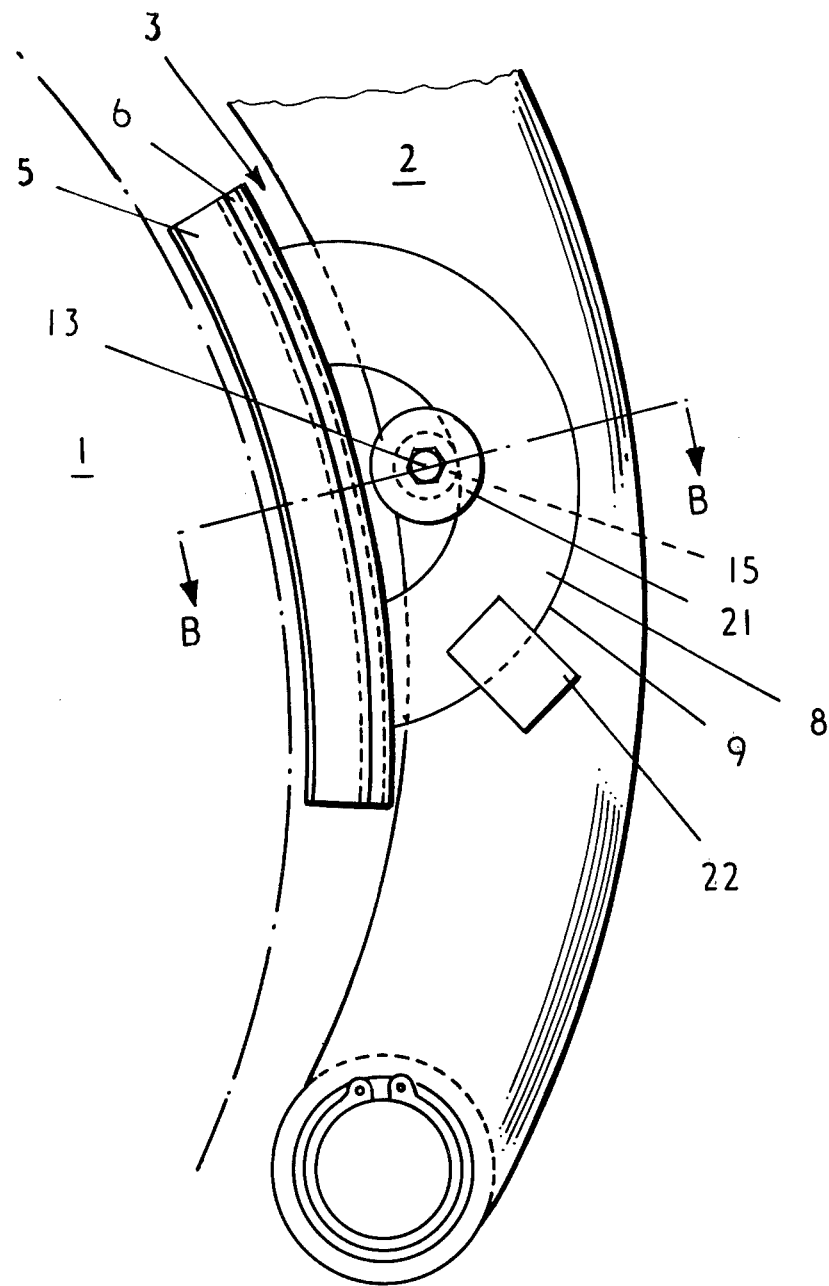
Figure 5:
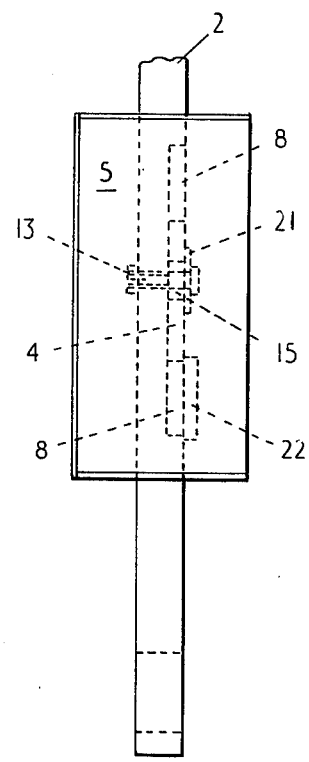
Figure 6:
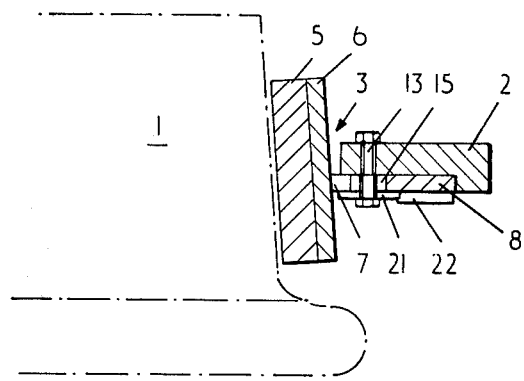

Two embodiments of the present invention will now be described, by way of example only, with reference to the accompanying drawings in which:

FIG. 1 is a side view of a first embodiment of the brake equipment of the present invention, FIG. 2 is a front end view of part of FIG. 1, FIG. 3 is a sectional view looking along AA of FIG. 1, FIG. 4 is a view similar to FIG. 1, but incomplete and of a second embodiment of the invention, FIG. 5 is a view similar to FIG. 2, but incomplete and of the second embodiment, and FIG. 6 is a sectional view looking along BB of FIG. 4.

Referring to FIGS. 1, 2 and 3 of the drawings, part of a mine manriding car wheel is indicated by 1, a brake support lever by 2, and a brake shoe arrangement 3. The brake lever contains a recess means 4. In FIGS. 1 to 3, the recess means comprises a slot 4. The slot 4 has particular importance in the present invention since it must be of a particular shape as explained later in the specification.

The brake shoe arrangement 3 comprises a friction pad 5, a brake shoe 6, and a vane 7. The friction pad 5 and the vane 7 are fixedly attached to opposite sides of the brake shoe 6. The vane 7 is shown rotatably engaged within the support lever 2, and has an engaged part 8 (shown dotted in FIG. 1).

The vane 7 has peripheral edge 9, furthest away from the friction pad 5, which peripheral edge abuts the slot 4. The peripheral edge 9 is equidistant throughout from the brake shoe center of mass. The center of mass of the brake shoe arrangement 3 is indicated at X in FIG. 1.

The slot 4 within the support lever 2 is manufactured to be of a shape which mates, as closely as practicable within manufacturing tolerances, with the peripheral edge 9 of the vane 7.

Consequently, the slot 4 has a surface abutting the peripheral edge 9 of the vane 7, which surface is also equidistant throughout from the center of mass of the brake shoe arrangement 3, when the brake shoe arrangement is engaged within the slot.

The brake shoe arrangement 3 is retained in position with respect to the lever 2, by a bolt 13 which passes through the lever 2 and the vane 7 of the brake shoe arrangement. The bolt 13 has a portion 14 within the lever 2 (see FIG. 3) said portion being sleeved by a resilient bush 15.

The resilient bush 15 is provided so that an edge 10 of the vane 7 away from the peripheral edge 9 is able to move closer to or further away from the bolt 13, which edge 10 remains in contact with the resilient bush during such movement. Such movement occurs complementarily to rotational movement of the brake shoe arrangement 3 about the bolt 13 because the vane 7 cannot be manufactured so as to have a uniform thickness between the edges 9 and 10. The peripheral edge 9 remains in mating engagement with the slot 4 throughout such movement owing to the resilience of the bush 15. Occurrence of the rotational movement of the brake shoe arrangement 3 is explained more fully later in the specification. Additionally, as will also be explained later in the specification, the bush 15 is important because the center of mass of the brake shoe arrangement moves as the friction pad 5 is worn during normal use of the brake arrangement.

Since the peripheral edge 9 is arranged about the center of mass of the brake shoe arrangement and abuts the slot 4 in the lever 2, and is retained in abutment, the brake shoe arrangement is free to rotate only about its center of mass. Consequently the brake shoe arrangement is constrained to behave as though it were retained in position by a bolt through its center of mass, despite being retained by the bolt 13 away from its center of mass. Hence, resultant torque owing to imbalance of the brake shoe arrangement about its center of mass cannot occur. The friction pad 5 of the brake shoe arrangement 3 will on that account wear evenly.

However, the brake shoe arrangement 3 is still free to rotate when desired, for example during insertion or removal from the brake lever 2. Desired rotation may also occur, for example, after insertion of the brake shoe arrangement if it is misaligned. Such misalignment is removed when the brake shoe arrangement moves into braking co-operation with the mine car wheel.

As mentioned, the position of the center of mass of the brake shoe arrangement moves as the friction pad 5 is worn. The vane 7 is made so as to have a peripheral edge 9 arranged about the center of mass of the brake shoe arrangement, when the friction pad is half worn.

The resilient bush 15 around the bolt 13 tends to counteract undesired effects of the movement of the center of mass of the brake shoe arrangement, since rotation of the brake shoe arrangement, owing to such movement is inhibited by frictional resistance between the vane 7 and the bush 15.

It can be seen, with reference to FIG. 3, that the wheel 1 is not parallel to the support lever nearest thereto. The friction pad 5, of the brake shoe arrangement 3, is necessarily parallel to the wheel 1 in order that wear of the friction pad is even. Consequently, the vane 7 does not intersect the face 12 perpendicularly.

A second embodiment of the invention is now described with reference to FIGS. 4, 5 and 6, wherein like reference numerals are used as appropriate to refer to like items in the FIGS. 1, 2 and 3. In the second embodiment, the recess means 4 comprises a groove milled into one side of the support lever 2. The groove is machined so as to fit the vane 7 of the brake shoe arrangement as closely as is practicable.

The brake shoe arrangement is retained in the groove 4, by a washer 21 which traps the vane 7 and which is held on the bolt 13. A metal plate 22 is welded onto the support lever 2 and provides further retaining means for the vane 7 of the brake shoe arrangement.

It can be seen from the Figures, that the brake shoe arrangement 3 of the second embodiment comprises a larger shoe 6 and friction pad 5 than in the first embodiment.

The vane 7 is offset from the center of the brake shoe 6 so that the position of the friction pad 5 with respect to the wheel 1 is similar in operation in both described embodiments, despite the vane engaging in the groove in the side of the lever 2 as opposed to the slot in the center of the lever 2 as described with reference to the first embodiment.

The vane 7 is not perpendicularly disposed with respect to the brake shoe 6 in the second embodiment, but is inclined at a slight angle to the perpendicular, in order that the brake shoe 6 remains parallel to the wheel 1. This is most clearly seen in FIG. 6, wherefrom it can be appreciated that the vane part 8 lies snug in the lever 2, but that the friction pad 5 is nonetheless substantially parallel to the wheel 1.

In other embodiments of the invention, the vane intersects the support lever at any other angle suitable for design constraints imposed upon the brake equipment.

In yet further embodiments of the invention, the support lever 2 can be segmented so that parts of the vane 7 slidably engage different segments of the lever.

From the above description it can be seen that the present invention provides brake equipment including brake shoe arrangements which tends to wear more evenly than hitherto because undesired pivotal movement of the brake shoe arrangements away from desired alignment positions is avoided.

I claim:

1. Brake equipment comprising a support lever containing an arcuate recess means, and a brake shoe arrangement carried by the support lever and comprising a brake shoe with a friction pad and an arcuate vane fixedly attached to opposite sides thereof, said vane having a peripheral edge equidistant throughout from the brake shoe arrangement center of mass when said friction pad is one-half worn, the recess means being shaped to mate with the peripheral edge to allow slideable engagement of the peripheral edge within the recess means so that the brake shoe arrangement is constrained to rotate about said center of mass thereby allowing even wear of said friction pad.

2. Brake equipment as claimed in claim 1 wherein a retaining means is attached to the support lever and in engagement with said vane of the brake shoe arrangement, the retaining means retaining the vane of the brake shoe arrangement in said slidable engagement with the recess means in the support lever.

3. Brake equipment as claimed in claim 2, wherein the brake shoe arrangement is resiliently engaged by the retaining means.

4. Brake equipment as claimed in claim 3, wherein the retaining means comprises a bolt, sleeved by a resilient bush, the bolt being insertable through the support lever and the brake shoe arrangement and the resilient bush abutting the vane of the brake shoe arrangement to inhibit relative movement between the bush and the vane.

5. Brake equipment as claimed in claim 4, wherein the retaining means also comprises a metal plate fixedly secured to the support lever, the metal plate retaining the vane in the recess means.

6. A brake comprising:
   (a) a support lever having an arcuate recess means;
   (b) a brake shoe arrangement carried by the support lever comprising a brake shoe having a friction pad on one side thereof and an arcuately shaped vane on the other side thereof, said vane cooperating with the arcuate recess of the support lever;

(c) the vane having an inner peripheral edge and an outer peripheral edge defining a vane thickness therebetween, at least the outer peripheral edge being equidistant from the center of mass of the brake shoe arrangement when said friction pad is one-half worn; the inner peripheral edge of the vane defining with the brake shoe an open space;

(d) a pivot pin carried by said support lever and passing through said open space so as to maintain the vane in slidable engagement with the arcuate recess means on the support lever in order that the brake shoe arrangement is constrained to rotate about said center of mass thereby allowing even wear of said friction pad.

7. The brake of claim 6 in which the pivot pin is spaced from the edge of the arcuate recess by a distance slightly greater than said vane thickness.

8. The brake of claim 6 in which the pivot pin carries a resilient bush, said bush being positioned to frictionally engage the inner peripheral edge of the vane.

* * * * *